J. H. LIVELY.
AUTOMOBILE JACK.
APPLICATION FILED MAR. 20, 1917.
1,265,688.
Patented May 7, 1918.
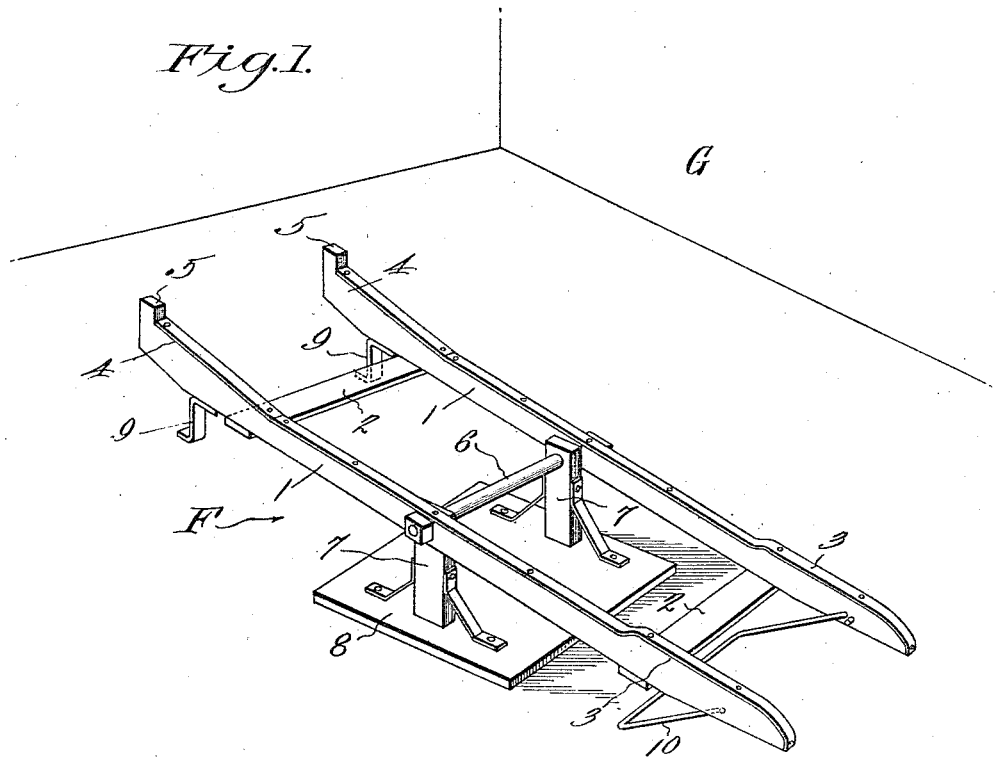
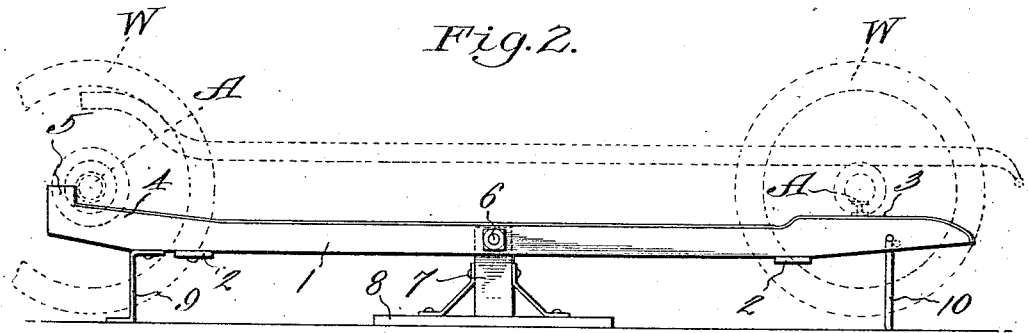
WITNESSES
INVENTOR
J. H. Lively,
BY Victor J. Evans
ATTORNEY

UNITED STATES PATENT OFFICE.

JAMES H. LIVELY, OF REPUBLIC COUNTY, KANSAS, ASSIGNOR OF ONE-HALF TO L. LIVELY, OF ARCADIA, INDIANA.

AUTOMOBILE-JACK.

1,265,688.  Specification of Letters Patent.  Patented May 7, 1918.

Application filed March 20, 1917. Serial No. 156,130.

*To all whom it may concern:*

Be it known that I, JAMES H. LIVELY, a citizen of the United States, residing in the county of Republic and State of Kansas, near Chester, Nebr., have invented new and useful Improvements in Automobile-Jacks, of which the following is a specification.

This invention relates to vehicle body lifters, and more especially to those having side bars mounted on a fixed pivot; and the object of the same is to produce a jack onto which the automobile runs as it enters the garage, and by which the weight is automatically taken off the tires and the strain off the wheels, so that the car is supported by the jack only.

This object is carried out by making the jack of side bars pivotally supported between their ends on a fixed fulcrum, and spacing the bars a less distance than the gage of the wheels, so that when the car enters the garage the axles run up the jack in a manner which will be more fully described in the following specification and claim, and as shown in the accompanying drawings wherein:—

Figure 1 is a perspective view of this jack disposed within a garage which is shown only in outline, ready for use.

Fig. 2 is a side elevation of the jack in use, an automobile being indicated in dotted lines as supported thereon.

It is an essential part of the present invention that no part of any wheel touches it. I propose that the automobile wheels W shall travel on the floor F as usual when they enter the garage G, up to a certain point, but the axles A travel over the side bars or rails of this jack which are spaced from each other a less distance than the gage of the wheels, and in fact less than the distance between the inner ends of the hubs of the wheels or the brake drums thereon so that the axle shall ride on the upper edges of said rails.

As shown in the drawings, the jack is composed of two side rails 1, connected with and spaced from each other as at 2, each rail having near its front end an arched rise 3, near its rear end an oblique rise 4, and at its rear extremity an upright stop 5. Otherwise the upper edge of the rail is flat, and its body is of a length sufficient to accommodate the car to which it is adapted. That is to say, when one axle stands on one rise, the other axle should stand on the other, possibly directly against the stop if the car should happen to enter the garage with sufficient speed as explained below. A slight distance in rear of the center of these rails they are connected by a cross rod or rung 6 which is pivoted in uprights 7 rising from a suitable base 8 resting on or forming a part of the garage floor F. At the rear end of each rail is a depending foot 9, and connecting the front ends of the rails is a pivoted foot 10. The parts are of any materials desired, but it is preferable that the raised portions of the rails be of metal and quite smooth.

In use, the jack stands normally as seen in Fig. 1 with the front ends of the rails resting on the ground and the pivoted foot 10 folded so that it also rests on the ground or floor of the garage, and the fulcrum of the rails is at such height that at this time their rear ends will be some distance off the ground. When now the automobile is driven into the garage, the driver causes its wheels W to pass astride the jack and entirely out of contact with either rail thereof. The front axle passes of course entirely over the rails until it strikes the oblique rise 4, this tilts the rails on their fulcrum and the arched rise 3 of each rail comes under the rear axle A, and the momentum of the car causes both axles to travel on the smooth risers on the rails, even up against the stops 5 if such momentum is sufficient. Meanwhile the wheels have been lifted off the floor F, and when the car comes to rest all weight is removed from the wheels and tires and the entire machine is supported by the jack. As the rails tip downward at their rear ends, the feet 9 touch the floor, and the pivoted foot 10 swings downward and also touches the floor, and therefore the jack will not rock back to its original position until said pivoted foot is kicked purposely. This the operator does before he backs out of the garage. Meanwhile the car rests on the jack, and the operator can remove any tire or rotate any wheel; he can even start the engine and permit it to drive the rear wheels idly, as they do not touch the floor. Obviously this assists him greatly at times, especially when he is testing out his engine and wants to run it on trial with the clutch closed, and perhaps when he wants to test his brakes before starting out. As the center of gravity is preferably and almost invariably slightly forward of the fulcrum of the jack, the operator has but to kick the pivoted foot off the floor, when the front ends of the rails will descend under the weight of the car and the rear or driving wheels of the latter will drop onto the floor F. Now when the engine is started and the clutch thrown in on the reverse, the driver can cause the machine to back off the jack and out of the garage in a manner which will be clear. I found by experience that a device of this kind is a great saver of tires, because if the machine is permitted to remain in the garage for a considerable time with the weight of the superstructure resting on an inflated tire, the latter cracks and otherwise deteriorates, and is subjected to the moisture which would flow from the garage floor F if the same be of dirt or paving material. While I have found it advisable to support the fulcrum rigidly from the floor F of the garage, it obviously could be mounted on a base which is portable so that the entire jack could be moved to another point. These and other details may be left to the manufacturer, and I reserve the right to adopt them in the practical manufacture of the device.

What I claim is:—

A device of the character described comprising a base, spaced vertical uprights extending from said base, a substantially rectangular frame having its side bars disposed against the upper ends of said uprights, a pivot rod extending through said uprights and the side bars of said frame, the forward ends of said bars normally resting upon the ground, inclined portions on the rear ends of said bars, shoulders at the extreme rear ends of said inclined portions forming stops, said inclined portions and stops being engaged by the axle of a vehicle driven over said frame, foot members on the under sides of the rear ends of said side bars for limiting the downward movement thereof, and a pivoted U shaped yoke on the forward end of said frame for holding the same in elevated position after the rear end is depressed.

In testimony whereof I affix my signature.

JAMES H. LIVELY.

Copies of this patent may be obtained for five cents each, by addressing the "Commissioner of Patents, Washington, D. C."